United States Patent [19]

Dehnert et al.

[11] 4,167,394
[45] Sep. 11, 1979

[54] UNIFORMLY DYED WATER-SWELLABLE CELLULOSIC FIBERS

[75] Inventors: Johannes Dehnert; Guenter Hansen, both of Ludwigshafen; Hermann Kaack, Wachenheim; Wolf-Dieter Kermer, Fussgoenheim; Walter Kurtz, Bad Durkheim; Ernst Schaffner, Frankenthal, all of Fed. Rep. of Germany

[73] Assignee: BASF Aktiengesellschaft, Ludwigshafen, Fed. Rep. of Germany

[21] Appl. No.: 868,213

[22] Filed: Jan. 9, 1978

[30] Foreign Application Priority Data

Jan. 21, 1977 [DE] Fed. Rep. of Germany ....... 2702371

[51] Int. Cl.² ..................... C09B 29/36; C09B 29/38; D06M 1/00; D06P 1/04
[52] U.S. Cl. .......................................... 8/41 R; 8/54.2; 8/21 C; 8/93; 260/157; 260/162
[58] Field of Search ................ 8/54.2, 21 C, 93, 41 R, 8/41 C

[56] References Cited

U.S. PATENT DOCUMENTS

| 3,152,114 | 10/1964 | Siegel et al. | 260/157 |
| 3,398,134 | 8/1968 | Ball et al. | 260/157 |
| 3,579,498 | 5/1971 | Dunsworth | 260/162 |
| 3,706,525 | 12/1972 | Blackwell et al. | 8/21 C |
| 3,744,967 | 7/1973 | Thackrah | 8/93 |
| 3,794,463 | 2/1974 | Neumer | 8/93 |
| 3,988,310 | 10/1976 | Gerlach et al. | 260/162 |
| 4,049,377 | 9/1977 | Schwab et al. | 8/21 C |
| 4,056,354 | 11/1977 | Pittman et al. | 8/54.2 |

FOREIGN PATENT DOCUMENTS 2528743 1/1975 Fed. Rep. of Germany .
2524243 12/1976 Fed. Rep. of Germany .

Primary Examiner—Melvyn I. Marquis
Assistant Examiner—Maria S. Tungol
Attorney, Agent, or Firm—Oblon, Fisher, Spivak, McClelland & Maier

[57] ABSTRACT

Uniformly dyed water-swellable cellulosic fibers obtained by dyeing cellulosic fibers, in the swollen state, with a dye of the formula

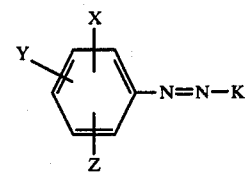

where X is hydrogen, chlorine, bromine, cyano, nitro, alkylsulfonyl of 1 to 4 carbon atoms, phenylsulfonyl, methoxy or ethoxy, Y is hydrogen, chlorine, bromine, cyano or nitro, Z is a radical of the formula

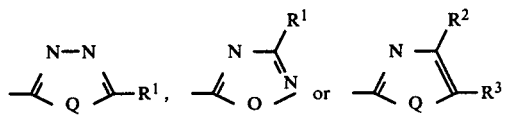

Q is oxygen or sulfur, $R^1$ is alkyl of 1 to 4 carbon atoms, methoxymethyl, phenoxymethyl or phenyl which is unsubstituted or substituted by chlorine, bromine, nitro, methyl, methoxy or ethoxy, $R^2$ is hydrogen, methyl, ethyl, phenyl or phenyl substituted by chlorine, bromine or methyl, $R^3$ is hydrogen, methyl or, if $R^2$ is methyl, is $C_1$ to $C_4$ alkoxycarbonyl, $R^2$ and $R^3$ together with the linking carbon atoms are phenylene or phenylene substituted by chlorine, methyl, methoxy or ethoxy and K is a radical of a coupling component selected from the pyrazolone, pyrazole, indole, quinolone or homophthalimide series.

5 Claims, No Drawings

UNIFORMLY DYED WATER-SWELLABLE CELLULOSIC FIBERS

The invention relates to uniformly dyed water-swellable cellulosic fibers, said fibers being fast to washing, dry cleaning, sublimation and light and being produced by contacting water-swellable cellulosic fibers successively or simultaneously with water, ethylene glycol or a derivative of ethylene glycol and, while the fibers are still swollen, with an essentially water-insoluble dye of the formula

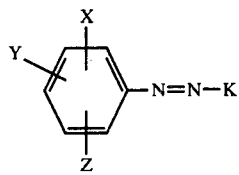

where X is hydrogen, chlorine, bromine, cyano, nitro, alkylsulfonyl of 1 to 4 carbon atoms, phenylsulfonyl, methoxy or ethoxy, Y is hydrogen, chlorine, bromine, cyano or nitro, Z is a radical of the formula

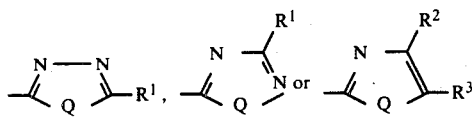

Q is oxygen or sulfur, $R^1$ is alkyl of 1 to 4 carbon atoms, methoxymethyl, phenoxymethyl or phenyl which is unsubstituted or substituted by chlorine, bromine, nitro, methyl, methoxy or ethoxy, $R^2$ is hydrogen, methyl, ethyl, phenyl or phenyl substituted by chlorine, bromine or methyl, $R^3$ is hydrogen, methyl or, if $R^2$ is methyl, is $C_1$ to $C_4$ alkoxycarbonyl, $R^2$ and $R^3$ together with the linking carbon atoms are phenylene or phenylene substituted by chlorine, methyl, methoxy or ethoxy and K is a radical of a coupling component selected from the pyrazolone, pyrazole, indole, quinolone or homophthalimide series. More particularly, the coupling components HK may, for example, have the following formulae

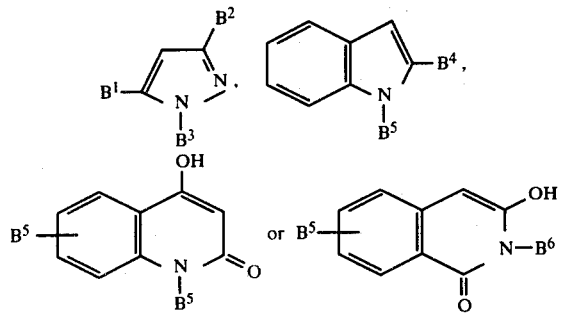

where $B^1$ is hydroxyl or amino, $B^2$ is hydrogen, methyl, carboxyl, alkoxycarbonyl (where alkoxy is of 1 to 4 carbon atoms), carbamoyl which is unsubstituted or substituted by alkyl of 1 to 8 carbon atoms, benzyl, phenylethyl, cyclohexyl, phenyl, methylphenyl, alkoxyalkyl (where alkoxy is of 1 to 8 carbon atoms and alkyl is of 2 to 4 carbon atoms) or phenoxyethoxypropyl, carbopyrrolidide, carbopiperidide or carbomorpholide, $B^3$ is hydrogen, alkyl of 1 to 8 carbon atoms, cyclohexyl, benzyl, phenylethyl, phenylpropyl, phenyl which is unsubstituted or substituted by chlorine, bromine, methyl, ethyl or nitro, or naphthyl, $B^4$ is hydrogen, methyl or phenyl, $B^5$ is hydrogen or methyl and $B^6$ is hydrogen, alkyl of 1 to 8 carbon atoms, allyl, cyclohexyl, benzyl, phenylethyl or phenyl which is unsubstituted or substituted by chlorine, methyl or methoxy.

The dyes of the formula I may be manufactured by reacting a diazo compound of an amine of the formula II

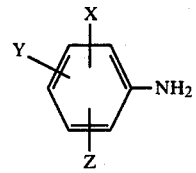

with a coupling component of the formula III

HK    III where X, Y, Z and K have the above meanings.

The amine may be diazotized in the conventional manner. The coupling may also be carried out in the conventional manner, in an aqueous medium, with or without addition of solvents, in a strongly to weakly acid medium.

Dyes, and mixtures of dyes, of the formula I a

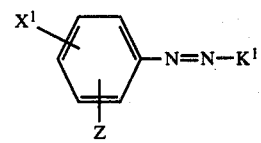

where $X^1$ is hydrogen, chlorine, bromine, methoxy or nitro and $K^1$ is the radical of a coupling component of the pyrazolone or indole series, and Z has the above meaning, are industrially of particular value for dyeing cellulosic fibers.

From the point of view of their structure, the dyes of the formula I may be described as essentially insoluble disperse dyes, which as a rule cannot be applied to, for example, cotton. However, German Pat. No. 1,811,796 discloses a process which permits printing such dyes onto cellulose and cellulosic textiles. The information in the said specification relating to process conditions also applies to dyeing with the dyes of the formula I. Further, German Laid-Open Applications DOS Nos. 2,524,243 and DOS 2,528,743 disclose other processes by means of which the dyes of the formula I may be applied. Amongst these, printing processes are preferred.

The dyes and prints have excellent fastness characteristics, amongst which the fastness to wet treatments and in some cases also the lightfastness should be singled out particularly. In the case of prints, for example, no staining of any white ground occurs on laundering.

To use a dye of the formula I, the dye is advantageously converted to a formulation which in addition to the dye of the formula I contains dispersants, humectants and water, with or without other components conventionally used in dye formulations, eg. disinfectants or anti-foam agents.

Suitable dispersants are cationic compounds, but preferably non-ionic and especially anionic compounds, ie. the dispersants conventionally used for disperse dyes. Specific examples are ligninsulfonates, sulfomethylation products of phenol, condensation products of phenolsulfonic acids, phenol, formaldehyde and urea, condensation products of β-sulfonaphthalene and formaldehyde, and polyadducts of propylene oxide and ethylene oxide with ethylene glycol, propylene glycol or ethylenediamine.

Humectants are, in particular, glycols and glycol ethers, eg. ethylene glycol, propylene glycol, diethylene glycol or ethylene glycol monomethyl ether.

In the Examples which follow, parts and percentages are by weight, unless stated otherwise.

EXAMPLE 1

5.7 Parts of o-(benzthiazolyl-2)-aniline are dissolved in 50 parts of 85% strength sulfuric acid and diazotized with 8.3 parts of nitrosylsulfuric acid (containing 11.5% of $N_2O_3$) at from 0° to 5° C. After stirring for 3 hours at 0°–5° C., the diazo solution is poured into a suspension obtained by adding 200 parts of ice and 2 parts of amidosulfonic acid to a solution of 5.2 parts of 1-(4-methylphenyl)-3-methyl-pyrazol-5-one in 150 parts of N-methylpyrrolidone. The coupling is completed by adding 240 parts of saturated sodium acetate solution.

The crystalline, orange product is filtered off, washed neutral and salt-free with water and dried under reduced pressure at 50° C. The dye gives a yellow solution in dimethylformamide and polyethylene glycols.

When polyester-cotton union fabrics or fabrics of the individual fibers are printed with solutions or aqueous dispersions of the dye and after-treated with live steam or hot air, clear, yellow prints with good fastness properties are obtained.

Commercial formulations of the above dye and the dyes described below may, for example, be obtained as follows: 30 parts of dye, 6 parts of dispersant, 10 parts of humectant, 1 part of disinfectant and about 53 parts of water are treated in a stirred ball mill until the particle size is about 0.5μ. The resulting dispersion is stable on storage.

EXAMPLE 2

13.5 parts of 4-bromo-2-(2-methyl-1,3,4-thiadiazolyl)-aniline are dissolved in a mixture of 36 parts of 85% strength sulfuric acid and 100 parts of a 17:3 mixture of acetic acid and propionic acid. Diazotization is carried out at from 0° to 5° C. by adding 16.5 parts of nitrosylsulfuric acid (containing 11.5% of $N_2O_3$) and then stirring for from 3 to 4 hours at 0°–5° C. The diazo solution is poured, at from 0° to 5° C., into a suspension of 11 parts of 1-methyl-2-phenyl-indole in 200 parts of dimethylformamide, 100 parts of acetic acid, 400 parts of ice water, one part of amidosulfonic acid and one part of an oxyethylated sperm oil alcohol, containing about 23 ethylene oxide units per molecule. The coupling is completed by adding 26 parts of anhydrous sodium acetate in 100 parts of water. After stirring overnight, the solution is heated to 50°–60° C. and the crystalline dye is filtered off at this temperature, washed neutral with warm water and dried under reduced pressure at 60° C. The dye, obtained as an orange brown powder, is used as an aqueous dispersion or as a solution in a polyethylene glycol to print fabrics of polyester, cotton or polyester/cotton union, and is then fixed with hot air or live steam. Deep orange prints having good fastness properties are obtained.

EXAMPLE 3

10.5 Parts of m-(benzoxazolyl-2)-aniline are stirred in 100 parts of water and 50 parts of 36% strength hydrochloric acid for 15 minutes at from 30° to 35° C. 100 parts of ice are added and diazotization is carried out at from 0° to 5° C. with 12 parts by volume of a 23% strength sodium nitrite solution. After stirring for two hours at from 0° to 5° C., the excess nitrous acid is removed by means of amidosulfonic acid. The diazo compound is added, at from −5° to 0° C., to a solution of 16.5 parts of 1-cyclohexyl-5-aminopyrazole in 200 parts of water, 50 parts of 36% strength hydrochloric acid and 300 parts of ice. The pH is brought to 3–4 by adding sodium acetate solution, whereupon the coupling rapidly goes to completion. The dye is isolated as described in Example 1. The resulting yellowish brown powder, which gives a yellow solution in dimethylformamide and polyethylene glycols, produces fast yellow prints on polyester, cotton and polyester/cotton union fabrics.

The dyes listed in Use Examples 4–9 were prepared by the methods described in Examples 1 to 3.

EXAMPLE 4

A cotton fabric is printed, by rotary screen printing, with an ink comprising 10 parts of the dye of the formula

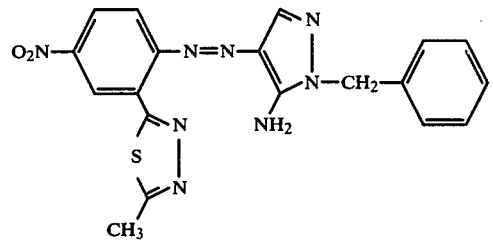

or a corresponding amount of a dye formulation, 100 parts of polyethylene oxide of molecular weight 300 and 790 parts of a 3% strength alginate thickener, and the print is dried at 100° C. It is then treated with hot air at 200° C. for 1 minute, rinsed cold, soaped at the boil, again rinsed cold and dried. A fast orange print on a white ground is obtained.

EXAMPLE 5

A polyester/cotton (weight ratio 67:33) union fabric is printed with a paste which comprises 20 parts of the dye of the formula

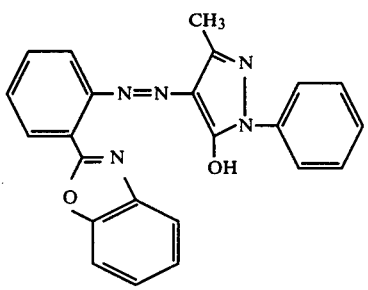

or of a corresponding amount of a dye formulation, 120 parts of the reaction product of polyethylene oxide of molecular weight 300 with boric acid in the molar ratio of 3:1 and 860 parts of a 10% strength alginate thickener. The print is dried at 105° C. and treated with live steam at 180° C. for 6 minutes. It is then rinsed with cold water, soaped at 80° C., rinsed cold and dried.

A lightfast and washfast yellow print on a white ground is obtained.

EXAMPLE 6

A cotton fabric is roller-printed with a print paste which comprises 15 parts of the dye of the formula

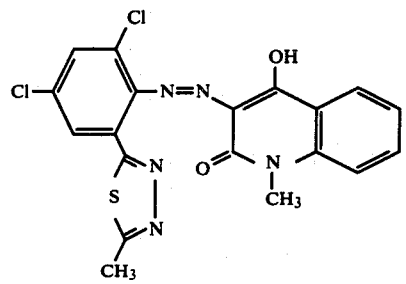

or a corresponding amount of a dye formulation, 110 parts of polyethylene oxide of molecular weight 350, 30 parts of oleyl diethanolamide and 845 parts of a 10% strength alginate thickener. The print is dried at 100° C. and then fixed by treatment with hot air at 195° C. for 1 minute. It is finished as described in Example 4, and a fast yellow print on a white ground is obtained.

EXAMPLE 7

A polyester-cellulose (weight ratio 67:33) union fabric is screen printed with an ink which comprises 30 parts of the dye of the formula

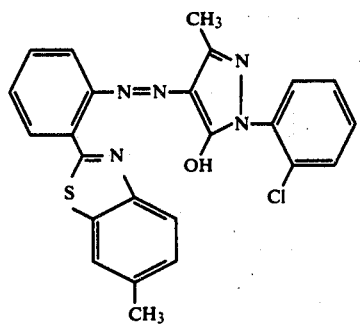

or a corresponding amount of a dye formulation, 100 parts of the reaction product of polyethylene oxide of molecular weight 300 with boric acid in the molar ratio of 3:1, 30 parts of oleyl diethanolamide and 840 parts of a 3% strength alginate thickener, and the print is dried at 110° C. It is then treated with live steam at 185° C. for 5 minutes and finished as described in Example 5. A fast yellow print on a white ground is obtained.

EXAMPLE 8

A cotton fabric is padded with a solution comprising 20 parts of the dye of the formula

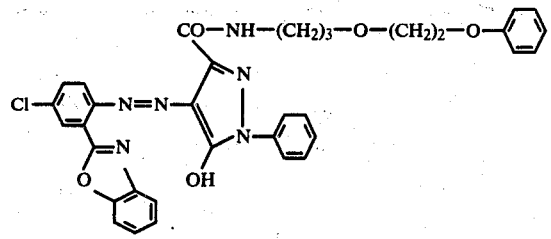

or a corresponding amount of a dye formulation, 300 parts of a 3% strength alginate thickener, 550 parts of water and 130 parts of polyethylene oxide of molecular weight 300, the liquor pick-up being 80%. The fabric is dried at 100° C. The dye is fixed by treating it for 5 minutes with live steam at 190° C. The fabric is then rinsed cold, and washed at 90° C. in a bath containing 3 parts of a condensation product of a long-chain alcohol with ethylene oxide and 997 parts of water. A reddish yellow dyeing is obtained.

Instead of a cotton fabric, a polyester/cotton (weight ratio 67:33) union fabric can be padded with the above solution. A reddish yellow dyeing in which the two fibers exhibit the same hue is obtained. Instead of with live steam, fixing may be effected with hot air at 195° C. for 2 minutes.

EXAMPLE 9

A cotton fabric is padded with a solution of 150 parts of polyethylene oxide in 850 parts of water to give a liquor pick-up of 80%, and the padded fabric is dried at 100° C. This pretreated fabric is then printed by rotary screen printing with an ink which comprises 30 parts of the dye of the formula

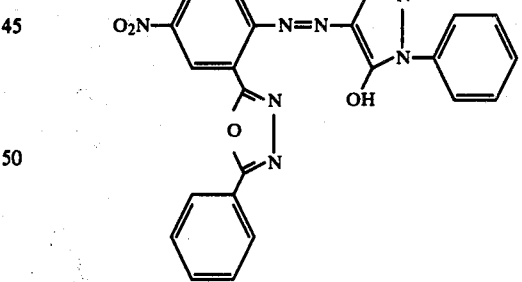

or a corresponding amount of a dye formulation and 970 parts of a 10% alginate thickener. After drying the print at 105° C., it is treated with live steam at 185° C. for 7 minutes and then finished by rinsing and soaping, as described in Example 4. A fast reddish brown print on a white ground is obtained.

The dyes listed in the Tables which follow are obtained by the method described in Examples 1 to 3. On polyester or cotton fibers, or polyester/cotton union fabrics, they exhibit similar tinctorial properties to those of the dyes listed in Examples 1 to 9.

| Example | Diazo component | Coupling component | Hue on polyester/cotton fabric |
|---|---|---|---|
| 10 | 2-aminobenzoyl-benzoxazole (2-aminophenyl linked via C=N–O to benzene ring fused to O) | 1-(4-methylphenyl)-3-methyl-5-hydroxypyrazole | yellow |
| 11 | " | 1-(2,5-dichlorophenyl)-3-methyl-5-hydroxypyrazole | " |
| 12 | " | 1-(3-nitrophenyl)-3-methyl-5-hydroxypyrazole | " |
| 13 | " | 1-phenyl-3-carboxy-5-hydroxypyrazole | reddish yellow |
| 14 | " | 1-phenyl-3-(benzylcarbamoyl)-5-hydroxypyrazole | reddish yellow |
| 15 | " | 1-phenyl-3-methyl-5-amino-pyrazole | greenish yellow |
| 16 | " | 1-methyl-2-phenylindole | orange |

-continued
| Example | Diazo component | Coupling component | Hue on polyester/ cotton fabric |
|---|---|---|---|
| 17 | " | 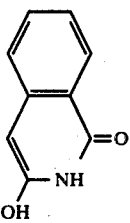 | yellow |
| 18 | " | 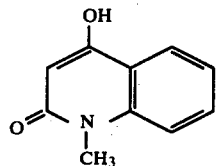 | " |
| 19 | 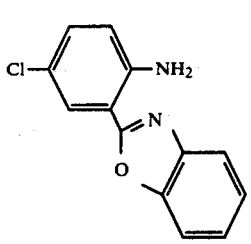 | 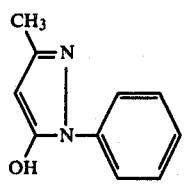 | " |
| 20 | " | 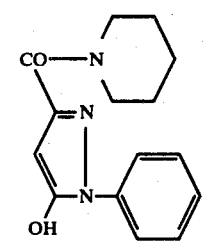 | reddish yellow |
| 21 | " | 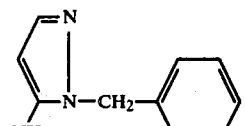 | greenish yellow |
| 22 | 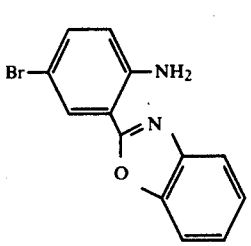 | 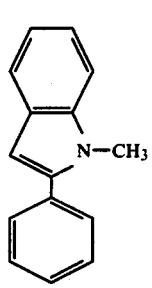 | orange |
| 23 | 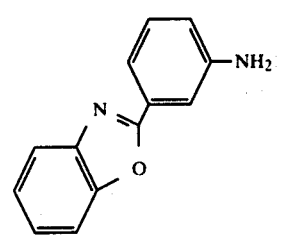 | 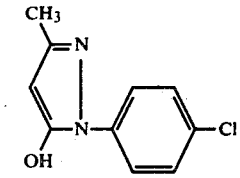 | yellow |

-continued
| Example | Diazo component | Coupling component | Hue on polyester/cotton fabric |
|---|---|---|---|
| 24 | " | 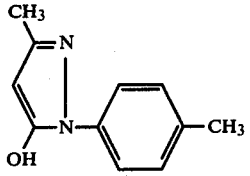 | " |
| 25 | " | 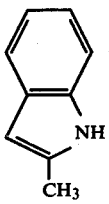 | orange |
| 26 | " | 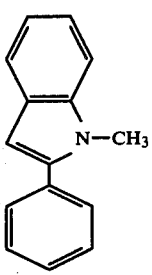 | " |
| 27 | 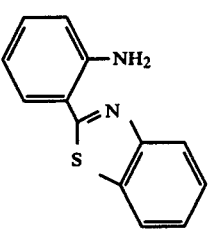 | 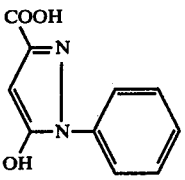 | reddish yellow |
| 28 | " | 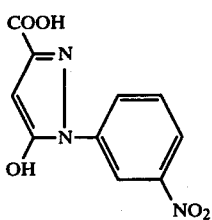 | reddish yellow |
| 29 | " | 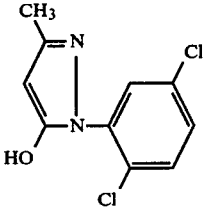 | reddish yellow |
| 30 | " | 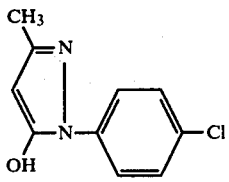 | reddish yellow |

-continued
| Example | Diazo component | Coupling component | Hue on polyester/ cotton fabric |
|---|---|---|---|
| 31 | " | 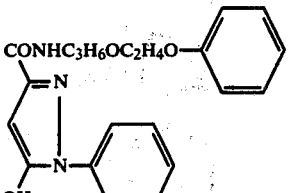 | reddish yellow |
| 32 | " | 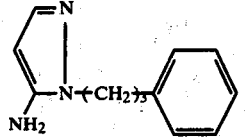 | greenish yellow |
| 33 | " | 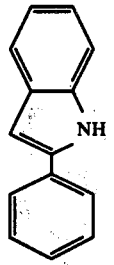 | orange |
| 34 | " | 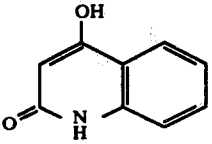 | greenish yellow |
| 35 | 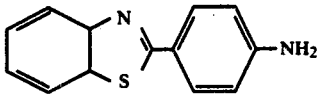 | 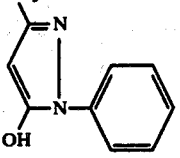 | yellow |
| 36 | 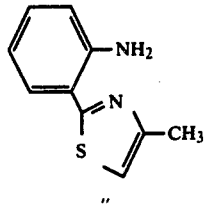 | " | " |
| 37 | " | 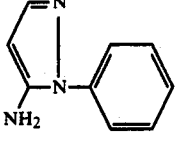 | greenish yellow |
| 38 | 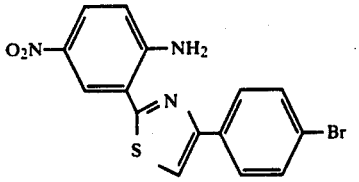 | 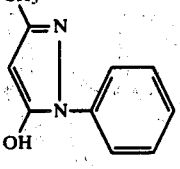 | yellowish brown |

-continued

| Example | Diazo component | Coupling component | Hue on polyester/cotton fabric |
|---|---|---|---|
| 39 | 3-bromo-5-nitro-2-amino-phenyl with S-C(=N)-C(CH$_3$)=CH-CO$_2$C$_4$H group | 1-methyl-2-phenylindole | reddish brown |
| 40 | 2-aminophenyl-C(=N-O-N=C(CH$_3$)) | 3-methyl-1-phenyl-5-hydroxy pyrazole | yellow |
| 41 | " | 2-phenylindole (NH) | orange |
| 42 | 5-chloro-2-amino-phenyl-C(=N-O-N=C-phenyl) | 3-methyl-1-(4-methylphenyl)-5-hydroxy pyrazole | yellow |
| 43 | 3-phenyl-5-(2-aminophenyl)-1,2,4-oxadiazole | 3-methyl-1-phenyl-5-hydroxy pyrazole | " |
| 44 | " | 3-chloro-1-(2,5-dichlorophenyl)-5-hydroxy pyrazole | " |

-continued

| Example | Diazo component | Coupling component | Hue on polyester/cotton fabric |
|---|---|---|---|
| 45 | " | (3-methyl-1-(p-tolyl)-5-hydroxypyrazole) | " |
| 46 | " | (3-carboxy-1-(3-nitrophenyl)-5-hydroxypyrazole) | " |
| 47 | " | (5-amino-1-phenylpyrazole) | greenish yellow |
| 48 | " | (3-hydroxy-isoquinolin-1(2H)-one type) | yellow |
| 49 | " | (4-hydroxyquinolin-2(1H)-one) | greenish yellow |
| 50 | " | (2-phenylindole) | reddish yellow |
| 51 | " | (1-methyl-2-phenylindole) | reddish yellow |

-continued

| Example | Diazo component | Coupling component | Hue on polyester/cotton fabric |
|---|---|---|---|
| 52 | " | 2-methylindole structure | reddish yellow |
| 53 | 2-amino-benzamidoxime with 4-nitrophenyl | 1-(3-chlorophenyl)-3-methyl-pyrazolone type (CH₃, N=N, OH, Cl) | yellow |
| 54 | 2-amino-benzamidoxime with 4-methylphenyl | 1-(2-chlorophenyl)-3-methyl-pyrazolone type | " |
| 55 | 2-amino-benzamidoxime with 4-chlorophenyl | 1-phenyl-pyrazolone-COOH type | " |
| 56 | 2-amino-5-nitro-benzamidoxime with phenyl | 2-phenylindole | reddish brown |

-continued
| Example | Diazo component | Coupling component | Hue on polyester/cotton fabric |
|---|---|---|---|
| 57 | " | 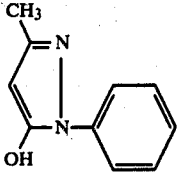 | reddish yellow |
| 58 | 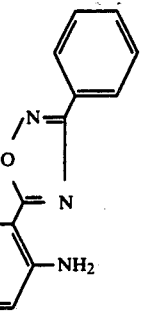 | " | yellow |
| 59 | 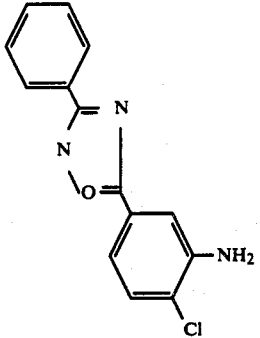 | 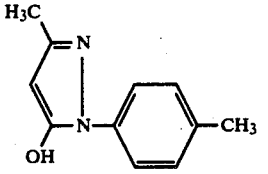 | " |
| 60 | " | 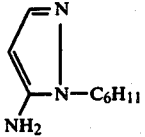 | greenish yellow |
| 61 | 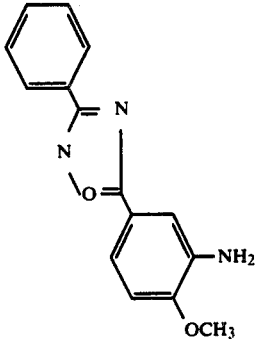 | 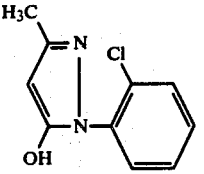 | yellow |
| 62 | 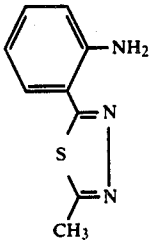 | 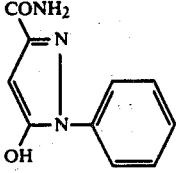 | orange |

-continued
| Example | Diazo component | Coupling component | Hue on polyester/cotton fabric |
|---|---|---|---|
| 63 | " | 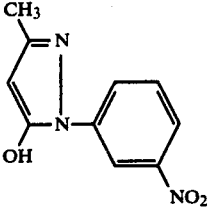 | yellow |
| 64 | 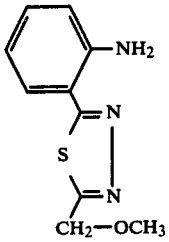 | 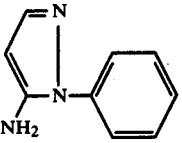 | greenish yellow |
| 65 | 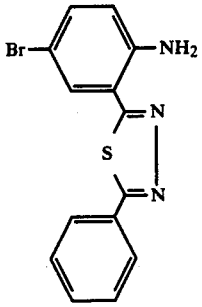 | 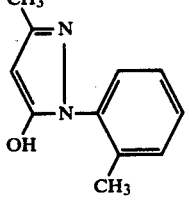 | yellow |
| 66 | " | 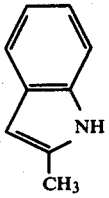 | orange |
| 67 | " | 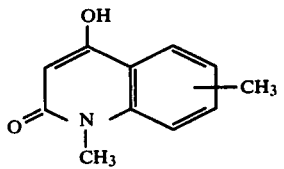 | yellow |
| 64 | 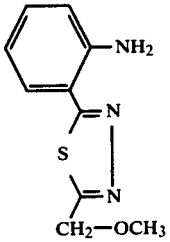 | 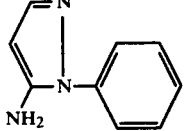 | greenish yellow |

-continued

| Example | Diazo component | Coupling component | Hue on polyester/cotton fabric |
|---|---|---|---|
| 65 | 4-bromo-2-amino-benzaldehyde-thiosemicarbazone-type structure (Br, NH2 on benzene; C=N–S–N=C–phenyl) | 1-(2-methylphenyl)-3-methyl-5-hydroxy-pyrazole | yellow |
| 66 | 2-(5-phenyl-1,3,4-thiadiazol-2-yl)-4-bromoaniline (isomer mixture) | 2-methylindole | orange |
| 67 | 2-(5-phenyl-1,3,4-thiadiazol-2-yl)-4-bromoaniline | 1,?-dimethyl-4-hydroxy-2-quinolone (1-CH3, ring-CH3) | yellow |
| 68 | 2-(3-aminophenyl)benzoxazole | 1-(3-chlorophenyl)-3-methyl-5-amino-pyrazole | " |
| 69 | " | 1-phenyl-3-methyl-5-amino-pyrazole | " |
| 70 | 2-amino-benzaldehyde-O-(2-methylphenyl-imino)-oxime type structure (NH2, C=N–O–N=C–(2-CH3-phenyl)) | | " |

-continued

| Example | Diazo component | Coupling component | Hue on polyester/cotton fabric |
|---|---|---|---|
| 71 | [structure: 4-chloro-3-amino phenyl – C(=O)–O–N=N–phenyl oxadiazole] | " | " |
| 72 | [structure: 4-methoxy-3-amino phenyl – C(=O)–O–N=N–phenyl oxadiazole] | " | " |
| 73 | [structure: 2-amino phenyl – C(=O)–O–N=N– (2-chloro)phenyl] | [structure: 3-methyl-1-(2-chlorophenyl)-5-hydroxypyrazole] | " |
| 74 | " | [structure: 3-methyl-1-(4-methylphenyl)-5-hydroxypyrazole] | " |
| 75 | [structure: 2-aminophenyl-1,2,4-oxadiazole-C$_6$H$_5$] | [structure: 3-methyl-1-(2-methylphenyl)-5-hydroxypyrazole] | " |

EXAMPLE 76

32 Parts of the dye from Example 32 in 200 parts of N-methylpyrrolidone are stirred with 7 parts of 70% pure copper-(I) cyanide for 9 hours at 70° C. 250 parts of methanol are added at room temperature. The dye is filtered off, washed with methanol, 10% strength ammonia solution and water and dried under reduced pressure at 50° C. The dye of the formula

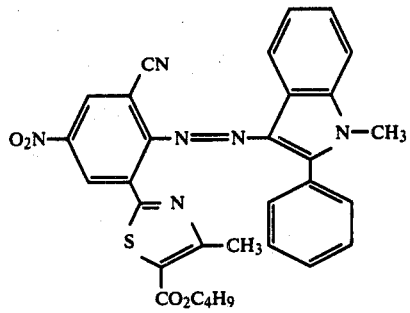

is obtained as a brownish red powder. When this is applied, by the methods described in Examples 4 to 9, to cotton or polyester fabrics or cotton/polyester union fabrics, yellowish red prints or dyeings with good fastness properties are obtained.

We claim:

1. Uniformly dyed water-swellable cellulosic fibers, said fibers being fast to washing, dry cleaning, sublimation and light wherein said fibers are dyed with at least one essentially water-insoluble dye of the formula

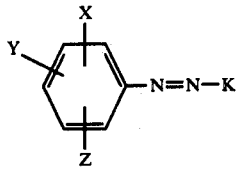

in which

X is hydrogen, chlorine, bromine, cyano, nitro, $C_1$ to $C_4$ alkylsulfonyl, phenylsulfonyl, methoxy or ethoxy, Y is hydrogen, chlorine, bromine, cyano or nitro, Z is

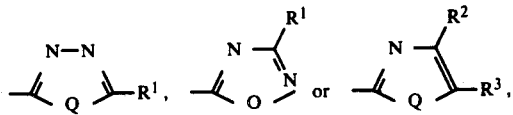

Q is oxygen or sulfur, $R^1$ is $C_1$ to $C_4$ alkyl, methoxymethyl, phenoxymethyl, phenyl or phenyl substituted by chlorine, bromine, nitro, methyl, methoxy or ethoxy, $R^2$ is hydrogen, methyl, ethyl, phenyl or phenyl substituted by chlorine, bromine or methyl, $R^3$ is hydrogen, methyl or, if $R^2$ is methyl, is $C_1$ to $C_4$ alkoxycarbonyl, $R^2$ and $R^3$ together with the linking carbon atoms are phenylene or phenylene substituted by chlorine, methyl, methoxy or ethoxy, K is

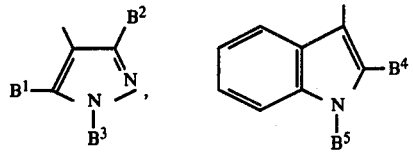

$B^1$ is hydroxy or amino, $B^2$ is hydrogen, methyl, carboxyl, $C_1$ to $C_4$ alkoxycarbonyl, carbamoyl, carbamoyl mono- or disubstituted on the nitrogen by $C_1$ to $C_8$ alkyl, benzyl, phenylethyl, cyclohexyl, phenyl, methylphenyl, $C_1$ to $C_8$ alkoxy-$C_2$ to $C_4$-alkyl or phenoxyethoxypropyl, carbopyrrolidide, carbopiperidide or carbomorpholide, $B^3$ is hydrogen, $C_1$ to $C_8$ alkyl, cyclohexyl, benzyl, phenylethyl, phenylpropyl, phenyl, phenyl substituted by chlorine, bromine, methyl, ethyl or nitro, or naphthyl, $B^4$ is hydrogen, methyl or phenyl, $B^5$ is hydrogen or methyl.

2. The fibers according to claim 1, where X and Y are hydrogen, chlorine or bromine.

3. The fibers according to claim 1, where X is hydrogen, chlorine, bromine, methoxy or nitro, Y is hydrogen.

4. The fibers according to claim 1 where Z is

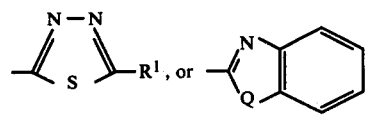

5. The fibers according to claim 1 where $B^1$ is hydroxy.

* * * * *